United States Patent [19]
Gray

[11] Patent Number: 5,638,366
[45] Date of Patent: Jun. 10, 1997

[54] DATA TRANSPORT FOR INTERNAL MESSAGING

[75] Inventor: Thomas A. Gray, Carp, Canada

[73] Assignee: Mitel Corporation, Kanata, Canada

[21] Appl. No.: 996,662

[22] Filed: Dec. 24, 1992

[30] Foreign Application Priority Data

Dec. 31, 1991 [CA] Canada ................... 2058654

[51] Int. Cl.$^6$ .................................. H04Q 11/08
[52] U.S. Cl. ............................ 370/361; 370/362
[58] Field of Search ............ 370/94.1, 67, 60, 370/65, 16, 15, 85.1, 58.1, 58.2, 58.3

[56] References Cited

U.S. PATENT DOCUMENTS

| | | | |
|---|---|---|---|
| 4,393,497 | 7/1983 | Cantwell, Jr. ................ | 370/89 |
| 4,498,168 | 2/1985 | Tseng ........................... | 370/86 |
| 4,761,832 | 8/1988 | Gade et al. .................... | 455/612 |
| 4,766,590 | 8/1988 | Hamuda et al. ................ | 370/56 |
| 4,769,807 | 9/1988 | Niwa et al. ..................... | 370/16 |
| 5,132,832 | 7/1992 | Matz et al. ..................... | 370/85.5 |
| 5,140,587 | 8/1992 | Nueller et al. ................. | 370/85.15 |

FOREIGN PATENT DOCUMENTS

| | | |
|---|---|---|
| 2089176 | 6/1982 | United Kingdom. |
| 2168574 | 6/1986 | United Kingdom. |
| WO 84/05009 | of 0000 | WIPO. |

Primary Examiner—Douglas W. Olms
Assistant Examiner—Ajit Patel
Attorney, Agent, or Firm—Charles E. Wands

[57] ABSTRACT

A communications bus is established by connecting a plurality of transceivers to a central automatic space division switching apparatus, and connecting the transceivers in series through the switching apparatus to form a folded bus structure, one of the transceivers forming a bus master for initiating and terminating trains of signals.

3 Claims, 3 Drawing Sheets

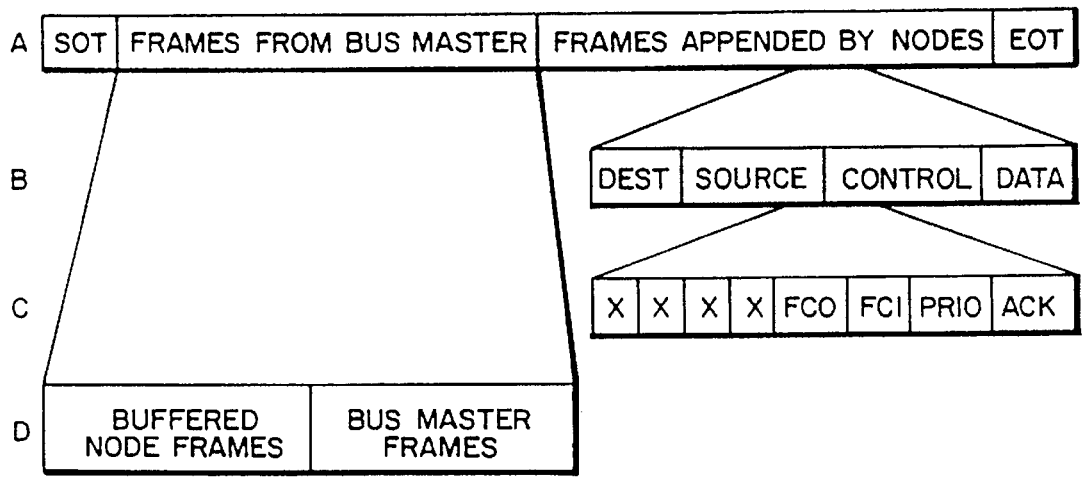
FIG. 4A
FIG. 4B
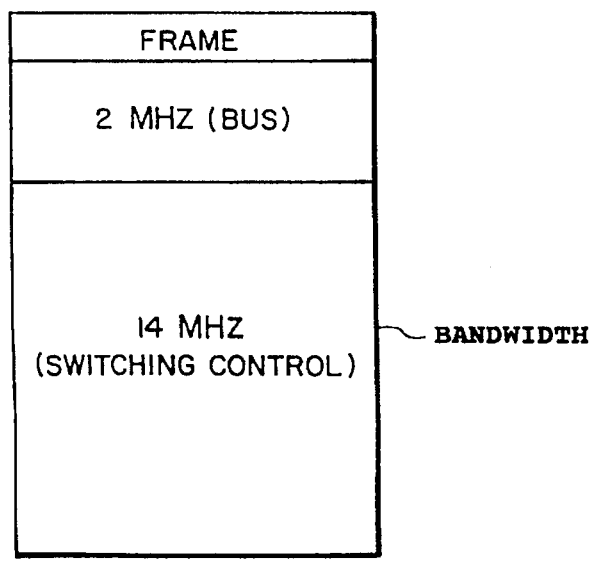
FIG. 5

DATA TRANSPORT FOR INTERNAL MESSAGING

FIELD OF THE INVENTION

This invention relates to a system for communicating signals in a switching system such as a telephone system.

BACKGROUND TO THE INVENTION

A variety of different systems exist for transporting data signals from and to incoming and outgoing lines, such as in a telephone switching system. One type of such system utilizes a central space division switch under central control which interconnects lines and trunks directly. Another type of system utilizes a combination time and space division switching system, and peripheral control units to which peripherals such as line circuits and trunks are connected. Such systems convert analog signals to data signals and switch them via centralized switches such as circuit switches and message switches, as described in U.S. Pat. No. 4,615,028. Other systems have line circuits and trunks connected to a common bus, and data is sent between them in dedicated channels, such systems being referred to as time division switching systems.

A problem with all such systems is that there is limited bandwidth to provide control signals for the peripheral units. This limited bandwidth has restricted applications and features which otherwise could be provided.

Another family of data communication systems has been described, in which a bus carries data in a ring or U from a bus master. While there are various versions of the structure, typical systems are described in U.S. Pat. No. 4,498,168. In such systems, a bus master initiates a signal to be passed around the bus, and each unit (hereinbelow referred to as a node) which can transmit and/or receive a signal, senses the signal. If the signal is addressed to it, it receives its message, and if it has a signal to transmit to another node or to the bus master, it appends its message to the signal. The signal starts with a "start of train" (SOT) byte and ends with an "end of train" (EOT) byte. There are various forms of such systems, such as the bus being U-shaped, S-shaped, and various techniques are used to ensure that the various nodes have a chance to both receive all signals and transmit to all other nodes and to the bus master, while avoiding signal collisions.

The latter type of system has been found to be unsuitable for use in telephone systems, because in the case of a fault, major disruption to the system occurs. For example, in case of a catastrophic failure of a node, it must be physically removed or bypassed. Such systems are also not easily reconfigured.

SUMMARY OF THE INVENTION

The present invention is a system for transporting signals between nodes which is highly suitable for use in a telephone switching system, and can be easily and rapidly reconfigured under software control. Faulty nodes can be easily and quickly tested and bypassed.

To provide the above system, a folded bus architecture is used, with a central space division switching system which interconnects the nodes under software control. The configuration of the bus is therefore controlled and established by the switching system. Such a system is highly desirable for use using optical fibers, in which the bandwidth of the optical fiber can be divided to carry the bus signal as well as other control and message signals.

In accordance with an embodiment of the invention, a communication switching system is comprised of a plurality of signal generating and receiving nodes, and a central space division switching apparatus for connecting at least some of said nodes serially thereby forming a bus, one of the nodes forming a master node terminating the bus and for generating a signal train containing messages for the nodes and applying the signal train to a beginning of the bus, and receiving the train from an end of the bus.

In accordance with another embodiment of the invention, a method of establishing a communications bus is comprised of connecting a plurality of transceivers to a space division switching apparatus, and connecting the transceivers in series via the switching apparatus to form a folded bus structure, one of the transceivers forming a bus master for initiating and terminating trains of signals.

BRIEF INTRODUCTION TO THE DRAWINGS

A better understanding of the invention will be obtained by reference to the detailed description below, in conjunction with the following drawings, in which:

FIG. 1 is a block diagram of a space division switching system in accordance with the prior art, FIG. 2 is a block diagram of the system in accordance with the present invention, FIG. 3A is FIG. 2 redrawn for easier understanding, FIG. 3B is a block diagram of the present invention shown in another form for easy visualization, FIG. 3C is a block diagram illustrating the present invention in which one of the nodes has been bypassed, FIG. 4A and 4B illustrate forms of signals carried by the bus, and FIG. 5 illustrates the manner in which bandwidth is preferred to be allocated in communication links between nodes.

DETAILED DESCRIPTION OF THE PRESENT INVENTION

Figure 1:
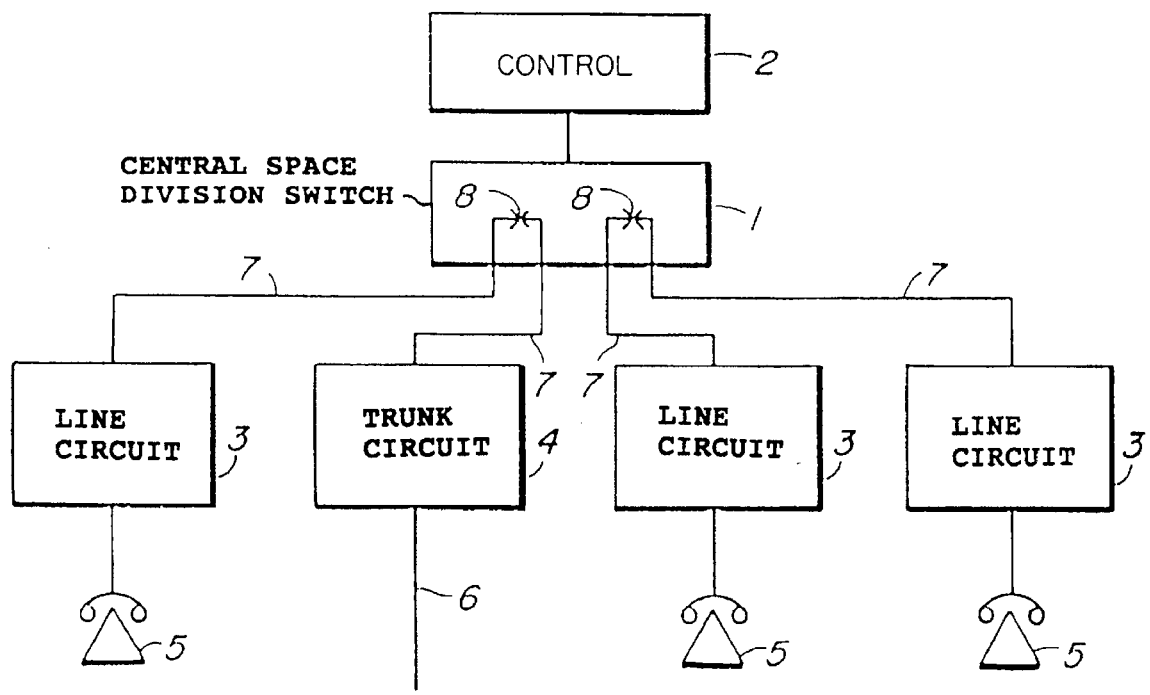

Turning to FIG. 1, a conventional space division switching system in accordance with the prior art is illustrated in block diagram.

A central space division switch 1 is controlled by a central controller 2. A plurality of peripherals such as line circuits 3 and trunk circuit 4, to which peripheral units such as telephone sets 5 and trunk line 6 are connected, have dedicated internal lines 7 (communication paths) to switch 1. The switch 1, under control of controller 2, connects the internal lines 7 by means of contacts 8, directly connecting the various lines and trunks.

Such systems can carry analog signals, or the analog signals can be translated into digital signals by means of codecs in the line and trunk circuits, and can be internally routed by peripheral control systems or other techniques. In some systems, rather than using space division switches 1, internal carriage of signals is by time division multiplexing on a bus.

Figure 2:
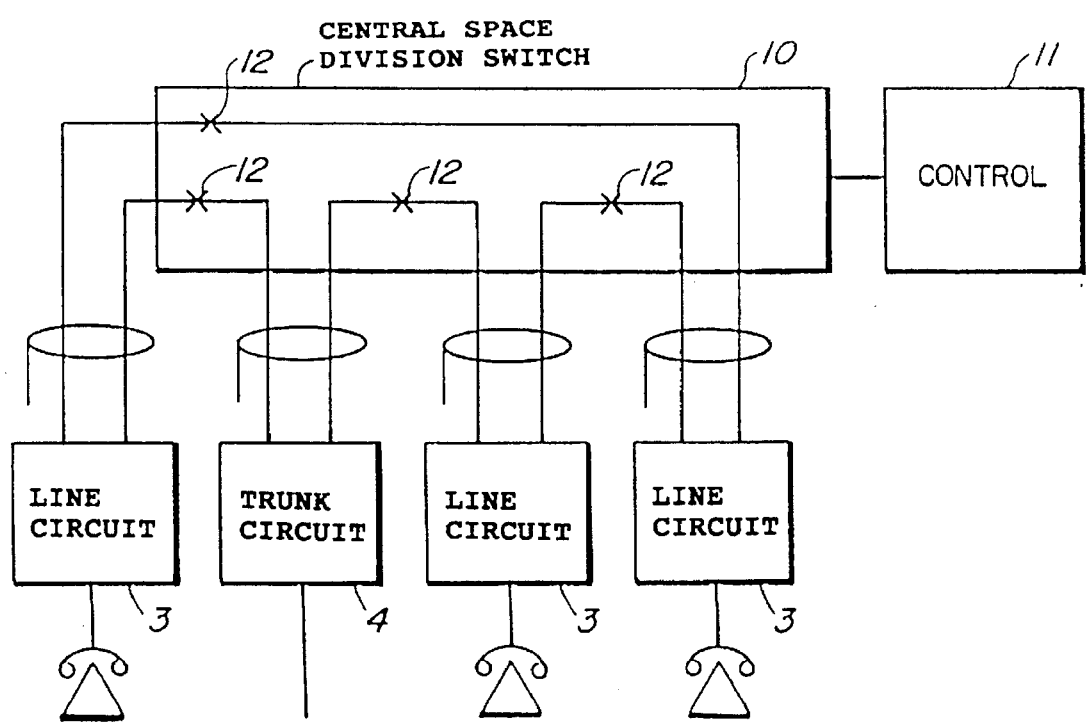

FIG. 2 illustrates the present invention in block diagram. The various representative peripherals 3 and 4 contain codecs and translate data from the various peripheral units such as telephone sets, trunk lines, etc. into digital signals in a well known manner. These signals are packetized, also in a well known manner. Of course the signals could arrive at the various peripherals already digitized and packetized. The conversion into packetized signals, being well known, does not form part of this invention.

Figure 3A:
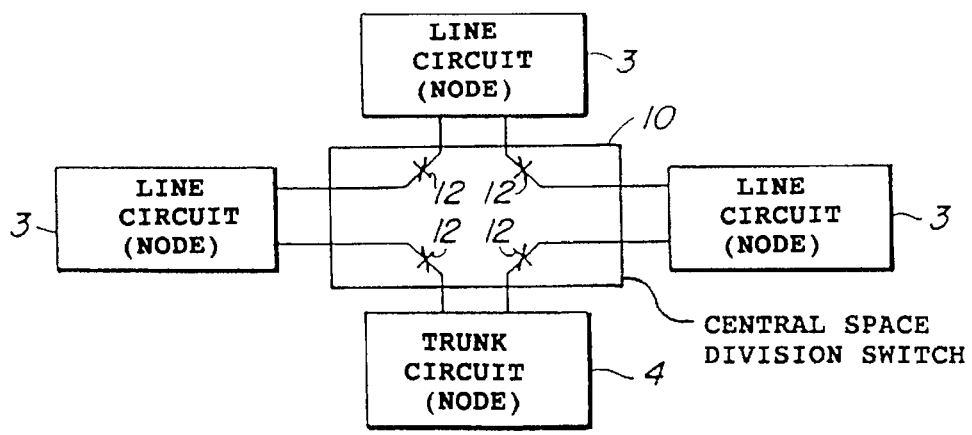
Figure 3B:
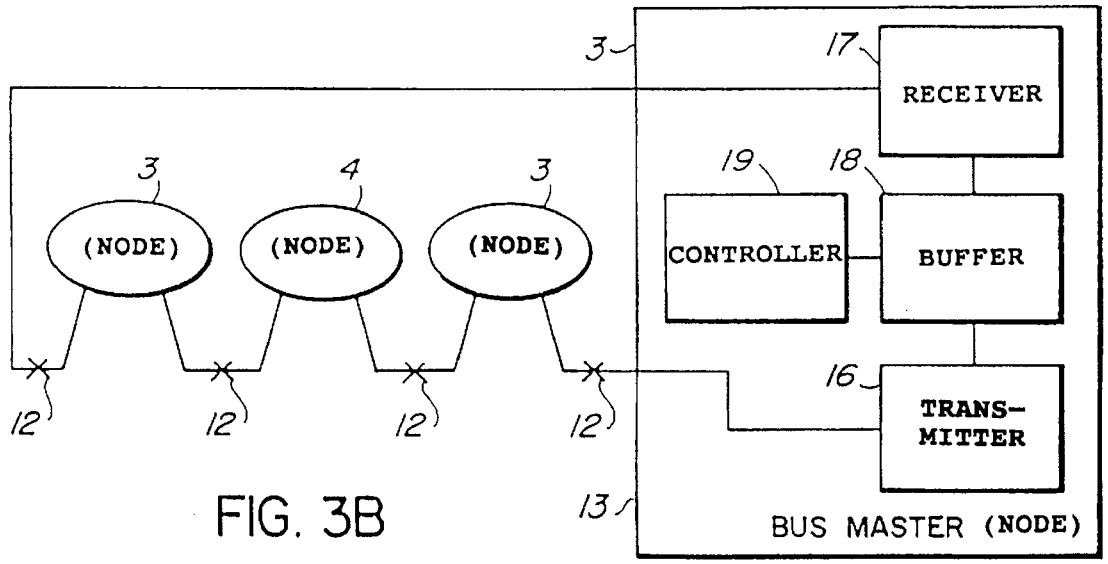

A central space division switch 10, under control of a controller 11, connects communication lines from the peripherals into a folded bus form, by means of its contact points 12. Other ways of visualizing the resulting structure may be seen in FIGS. 3A and 3B respectively. In FIG. 3A, the bus is shown to form a loop, passing through the switch 10, via contacts 12. In FIG. 3B, the same bus is shown in a resulting folded configuration, also connected via contact points 12. In FIG. 3B, one of the nodes labelled 3, is also labelled 13 to designate it as the bus master node (bus master). Any of the nodes may be designated as the bus master. The bus master however forms a termination to the folded bus, and is in control of the communications on the bus.

Thus it may be seen that once the configuration of a switching office is established, and the various nodes have been designated under control of software, the space division switch 10 need only close switches 12, establishing the folded bus. Since the communication between the various nodes are carried on via the established bus, the occurrence of switching by switch 12 is relatively rare. Accordingly the central control 11 in FIG. 2 (not shown in FIGS. 3A–3B), can be small in capacity in comparison to the control requirements of a prior art type of switching system, in which control must occur for every establishment and removal of a communication connection between peripherals. The processor time and memory capacity to operate switch 10 thus is substantially reduced from prior art systems.

Returning now to FIG. 3B, periodically the bus master starts communication by sending a "train" packet on the bus. This packet is preferably of the form shown in FIG. 4A. A minimum train consists of two bytes, a start of train (SOT) and end of train (EOT) byte. To initiate communications, the bus master begins communications by sending the minimum train. However in FIG. 4A, there is a communication to be sent to another node, and therefore, frames of data are inserted by the bus master between the SOT and EOT bytes.

The data train passes along the bus through switches 12, and is detected by each peripheral node 3, 4, etc. in turn. Each node waits for the SOT byte. When it recognizes the SOT byte, it examines the train for packets addressed to it. FIG. 4A, containing frames from the bus master between the SOT and EOT bytes, contains packets addressed to one of the peripherals 3, 4, 3 etc. The train therefore consists of the SOT and EOT byes and various packet data sandwiched in between.

After the variable packet data passes a node, the node detects an EOT byte. If the node has data to be transmitted to another node, it removes an EOT byte and substitutes its own packet followed by the EOT byte. In this manner the train moves along the bus to each node in sequence, gathering packets at each node. The train therefore can become longer at each node.

Eventually the train reaches the end of the bus, at the bus master 13. The bus master receives all of the packets and removes them from the bus, and recognizes the EOT byte. Once it recognizes the EOT byte, it issues a new data train and starts the cycle over again. In this manner, a train repetitively shuttles down the bus.

FIG. 4B illustrates in data waveform A a signal received from the bus by the bus master 13. It consists of an SOT byte, frames originally transmitted from the bus master, frames appended by the nodes, and an EOT byte. The various techniques for creating a train by a bus master, and for detecting the frame and appending frames to the train at the nodes are well known, and are described in the aforenoted U.S. Pat. No. 4,498,168.

Data waveform B illustrates a typical frame. It is formed of address headers, comprised of destination and source bytes, followed by control bytes, followed by data packets.

As shown in waveform C, each control byte is formed of control bits XXXX, two (or another quantity) of frame control bytes FC0 and FC1, a PR10 byte and acknowledgement byte or bit ACK.

Each node examines the frame for those addressed to it. If it finds a frame addressed to it, it will mark the frame as read, by setting the ACK bit or byte in the control byte as read.

When the signal is received back at the bus master, it reads which messages have been acknowledged as read, and deletes them from the train. With reference to FIG. 3B, the bus master is comprised of a transmitter 16 for launching the train along the bus, a receiver 17 for receiving the signal from the bus, and a buffer 18, all controlled by a controller 19. The signal after being received by the receiver 17 is applied to the buffer 18, the acknowledgement bits are analyzed by the controller 19, and under control of the controller 19, the transmitter transmits a new train containing the start of frame byte, frames from the bus master and the end of frame bytes, the signal from the bus master being comprised first of the buffered frames from the nodes which have not yet been read, followed by frames of data created for communication by the bus master (see waveform D in FIG. 4B).

Therefore the frames from the bus master contain no buffered node frames under the two conditions of the initiation of operation of the system, i.e., there will be only a SOT and EOT bytes. In the first condition if there were no signals applied by the nodes, and all signals have been read, and there are frames from the bus master being send to the nodes (this condition is shown in FIG. 4A). In the second condition all of the data initiated by the nodes has been read, and therefore the buffered node frames in data waveform D has shrunk to disappearance.

If desired, rather than the bus master removing frames acknowledged as having been read, it can recirculate those frames, for subsequent reading by the nodes. In this case each node examines the frames for its own source address. These will be frames it has sent previously. The node can examine that the acknowledgement bit or byte has been set, to ensure that the frame has been read. It can then either set another bit to confirm that the frame has been read, which would instruct the bus master to remove the frame, or cause it to be removed by other means. It should be noted that the bus master acts as a node in respect of the transmission and acknowledgement of the reading of the data by the recipient node.

Therefore the train, in normal operation, consists of sections of which the first are frames originally sent by the bus master. All of those frames should have been read. The bus master can check those frames for acknowledgement.

The second section of the train consist of frames appended by the nodes. Some of those frames will be addressed to the bus master, while others will be addressed to various nodes. These frames should be returned to the nodes, either for acknowledgement of the frames sent to the bus master or for completion of node to node messaging. The bus master buffers these frames.

When the EOT byte reaches the bus master, the bus master starts a new chain. It does this by sending a SOT byte, the buffered frames from the various nodes, and any newly generated bus master frames.

Returning now to FIG. 2, it may be seen that each of the peripherals is connected to the switch 10 by a forward and a return path. However it is preferred that both of those paths should be constituted by different frequency bands in a single optical fiber. Therefore a single optical fiber preferably connects each of the peripherals 3, 4, etc. to the switch 10.

FIG. 5 is a bandwidth diagram of the optical fiber, communicating through the central switch 10. Each optical fiber can have approximately 16 MHz bandwidth, in one embodiment. It is preferred that the first two MHz of each link are reserved for the bus system described herein. The space division switch 10 can provide asymmetric connections. Thus the channels, comprising the first two MHz of node 1, are switched to node 2, node 2 to node 3, etc.

The remaining 14 MHz bandwidth can be used for inter-node communication, i.e. for control, etc., and can contain control data for the central switch 10.

Since the bus signal is carried in the first two MHz of the fiber, which is reserved for it, it is desired to use this bandwidth to the maximum extent.

The bus master also should not initiate a new chain until it has received the EOT byte from the last train. This is required since the EOT is held by a node when it is inserting is new packet. If a new train were initiated by the bus master prior to having it receive the EOT byte, the new train could overrun and thus collide with the previous train. The trains should therefore be separated by an unusable period of time equal to the round trip time of the bus, which should be minimized.

The 14 MHz portion of the bandwidth is used as an internal control and messaging system for the system, but could also be used to carry packetized user data.

The bandwidth of the bus is set up within the fiber bandwidth, and is switched from node to node by the space switch 10. Therefore a configurable system is made available. The node is connected physically to the switch 10 only by one fiber cable. System software in control 11 causes switch 10 to bring a node into the bus by setting the appropriate paths through the space switch, by means of switch points 12. New nodes therefore can be added to the system without disrupting the activity of the bus. Defective nodes can be removed from the system simply by changing the space of the switch connection.

Figure 3C:
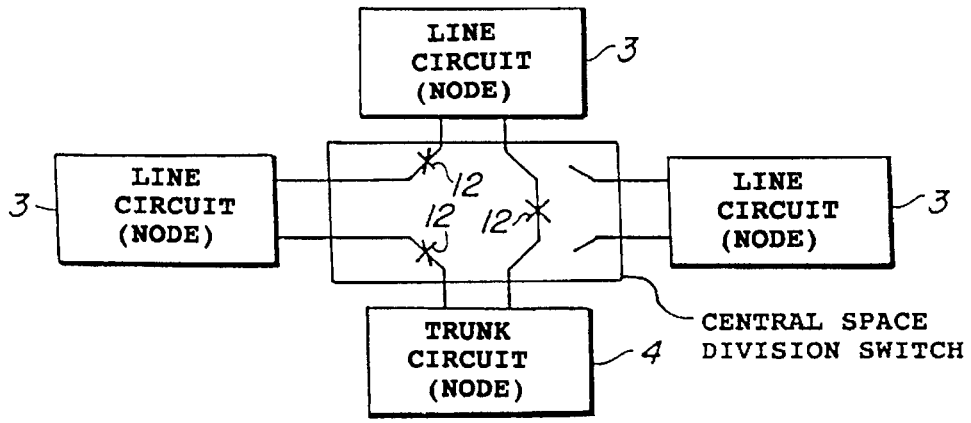

Defective nodes can be identified and isolated by temporarily suspending bus operation and connecting each in turn to the controller 11. As shown in FIG. 3C, a defective node can be identified and removed in e.g. less than 10 MS. This is not possible in prior art folded bus structures, which have complicated physical bypass switches to remove defective nodes and to add new nodes.

For a very large system, the switching apparatus 10 can be used to actively reconfigure the bus when demand is received from a node. With traffic confined to only a few nodes, the bus is established involving only those nodes, and the speed of communication is very fast. When there is a demand for service from other nodes, they can be switched into the bus. To provide this form of operation, the bus master must inform the system processor when there is a gap between trains of data, and the reconfiguration is performed in that gap. The system therefore can be expanded and contracted with demand, with a trade off of speed.

An additional benefit achieved in the present invention is the provision of redundancy. Prior art systems using a folded bus structure are either not redundant or require two physical fiber rings to create redundancy. In the present invention only the switch 10 need be redundant. The fiber connections to each node can be made non-redundant.

A person understanding this invention may now conceive of alternative structures and embodiments or variations of the above. All of those which fall within the scope of the claims appended hereto are considered to be part of the present invention.

I claim:

1. A communication switching system comprising a plurality of signal generating and receiving nodes, and an automatic central space division switching means for connecting at least some of said nodes serially forming a bus, one of said nodes forming a master node terminating said bus and for generating a signal train containing messages for said nodes, applying said signal train to a beginning of said bus, and receiving said signal train from an end of said bus, in which said signal train contains a start of train (SOT) byte, a master node end of train (EOT) byte and said messages sandwiched between said SOT and EOT bytes, and where in said nodes include means for appending messages to said signal train followed by an EOT byte in replacement of said master node EOT byte.

2. A system as defined in claim 1 in which said bus is formed of an optical fiber carrying said signal train to and from said automatic central space division switching means from and to each node.

3. A system as defined in claim 2 including means in said automatic central space division switching means and nodes for applying one or both of node control and node messaging signals to said bus, whereby additional communications are provided between said automatic central space division switching means and nodes.

* * * * *